United States Patent Office 3,507,828
Patented Apr. 21, 1970

3,507,828
THERMOSETTING RESIN MADE BY REACTION OF EPOXY COPOLYMER WITH POLYFUNCTIONAL AMINE AND THEN WITH ALDEHYDE
Henry Ashjian, East Brunswick, N.J.
(% Mobil Chemical Co., Metuchen, N.J.)
No Drawing. Filed Mar. 9, 1966, Ser. No. 532,881
Int. Cl. C08g *30/08*
U.S. Cl. 260—47
11 Claims

ABSTRACT OF THE DISCLOSURE

Thermosetting coating compositions are provided by forming a resinous epoxy-functional copolymer including a proportion of copolymerized ethylenically unsaturated epoxy compound and reacting this copolymer with a polyfunctional amine, especially melamine. This provides an hydroxy-functional derivative which is reacted with aldehyde such as formaldehyde so that, the final product will possess both alkylol and hydroxy functionality to enable thermosetting cure.

---

The present invention relates to novel thermosetting resins and especially non-gelled, solvent-soluble thermosetting acrylic resins and their preparation.

In the present invention, a resinous polyepoxide, and preferably an acrylic copolymer including epoxy functionality, is reacted with polyfunctional amine, especially polyamines, to generate an hydroxy amine derivative without gelation. This hydroxy amine derivative is then reacted with an aldehyde such as formaldehyde, in order to generate methylol groups in the resin. The methylol groups enable the copolymer to be thermoset by reaction between the methylol groups and the hydroxy groups which are either originally present in the polyepoxide or generated therein when the epoxy group is reacted with the polyamine.

As a matter of interest, polyfunctional amines are normally regarded as curing agents for epoxy resins providing unstable mixtures therewith, but the present invention utilizes this curing reaction without sacrificing solvent solubility.

While the invention is broadly useful as applied to any resinous polyepoxide, acrylic copolymers made by the solution copolymerization of vinyl monomer including a proportion of epoxy-functional ethylenically unsaturated material is especially contemplated.

Referring first to the broad class of resinous polyepoxides, these are typified by polyglycidyl ethers of polyhydric organic compounds, especially polyhydric phenols. Particularly, reference is had to the glycidyl ethers of bisphenols, a class of compounds which are constituted by a pair of phenolic groups interlinked through an intervening aliphatic bridge. While any of the bisphenols may be used, the compound 2,2'-bis(p-hydroxy-phenyl propane), commonly known as bisphenol A, is more widely available in commerce. These polyglycidyl ethers are produced by reacting the polyhydric compound with epichlorohydrin followed by dehydrohalogenation to form the glycidyl ether, the proportion of excess epichlorohydrin being regulated to control molecular weight which may vary to produce either liquid or solid polyepoxides, all of which are soluble in organic solvents.

As previously indicated, the preferred polyepoxides are provided by the solution copolymerization of ethylenically unsaturated material including the epoxy group. These are illustrated by glycidyl acrylate and methacrylate, though these are somewhat expensive. From this standpoint, one may react a polyepoxide with a stoichiometric deficiency of an unsaturated monoamide, such as acrylamide or methacrylamide to generate an unsaturated derivative which is copolymerizable and which possesses epoxy functionality. The stoichiometric deficiency can go down to as little as one mol of unsaturated monoamide per mol of polyepoxide and this is preferred. Less monoamide can be used, but then some of the polyepoxide would not be copolymerized into the final copolymer, which is not preferred.

The reaction of the polyepoxide with the monoamide is a liquid phase low temperature addition reaction which has been found to take place at temperatures sufficiently low as to substantially prevent homopolymer formation during the combination. Thus, reaction temperatures of 150° F. and below are used. This provides a distinct advantage over the use of other vinyl compounds which are significantly less useful because more elevated reaction temperatures are needed for reaction with the polyepoxide. The polyepoxides previously discussed are preferred for the reaction with monoamides.

While it is preferred to employ a glycidyl ether, the invention can also employ the 1,2-epoxy groups in any desired form, e.g., oily butadiene polymers and copolymers thereof with small amounts of styrene can be peroxidized to generate epoxy functionality therein and then copolymerized with other vinyl monomers to form a solution copolymer useful in the invention.

The ethylenic materials which are copolymerizable with the unsaturated amide-epoxide reaction product may be of diverse type, but preferably they are monomers containing a single $CH_2=C<$ group. While the preferred unsaturated monomers do contain the $CH_2C=C<$ group and while it is preferred to use combinations of monomers which form hard polymers such as styrene, vinyl toluene and methyl methacrylate with monomers which form soft polymers such as monoethylenically unsaturated carboxylic acid esters having a terminal aliphatic hydrocarbon group containing from 2–20 carbon atoms, illustrated by ethyl acrylate, butyl acrylate, 2-ethylhexyl acrylate, stearyl acrylate, butyl methacrylate, 2-ethylhexyl methacrylate and stearyl methacrylate, the invention is not restricted to the selection of monomers containing the $CH_2=C<$ group or to the selection of preferred combinations of monomers. Thus, monomers which do not contain the $CH_2=C<$ group may be interpolymerized either alone or in the presence of monomers which do contain the $CH_2=C<$ group. Particular attention is directed to maleic acid or anhydride, maleic acid monoesters and diesters, butene-2 and fatty acids containing conjugated unsaturation such as dehydrated castor oil fatty acids which are useful in the production of interpolymers with acrylamide. Still other monomers which may be used are acrylic acid, methacrylic acid, 1,3-butadiene, vinyl ethers such as n-butyl vinyl ether, allyl alcohol, bicyclo (2-2-1) hept-5-ene-2-methane, acrylamide, methacrylamide, etc. Allyl chlorides and especially vinylidene chloride can be used to provide resins of improved fire retardancy.

The epoxy-functional ethylenically unsaturated materials are broadly useful in any proportion in the copolymer, but weight proportions of from 3–5% of the copolymer are preferred, and proportions of from 5–40%, especially from 5–25% are particularly preferred.

Any polyfunctional amine may be used so long as it is either used in sufficient stoichiometric excess to prevent crosslinking of the resinous polyepoxide or if the reaction is terminated before gelation. Thus, ethyl amine, butyl amine and the like may be used, but it is preferred to employ polyamines such as ethylene diamine, diethylene triamine, triethylene tetramine and the like. Aromatic amines are also useful, such as aniline, p-toluidine and α-naphthylamine.

It is particularly preferred to employ polyamines known to be useful for the production of aminoplast resins. Thus, urea and melamine are especially useful as are substituted melamine, guanamine and other triazines.

While any proportion of polyfunctional amine is usable, at least 5% by weight of the final resin should be constituted by the amine. Preferably, a stoichiometric excess of polyfunctional amine is used, gelation being avoided by care in production and also by the use of a molar excess of at least 1.2:1, preferably at least 1.5:1, based on the reaction of one molecule of the amine with each epoxy group. This generates a plurality of hydroxy amine groups by an addition reaction with a minimum of cross-linking. It should be noted that the course of the reaction can be followed by the viscosity of the reaction mixture and the reaction can be stopped by the addition, for example, of formaldehyde, which consumes amine functionality by reaction therewith.

This hydroxy amine may be reacted in whole or in part with an aldehyde or a monoepoxide to generate alkylol reactivity. Typical monoepoxides are ethylene oxide, 1,2-propylene oxide, butylene oxide or styrene oxide. Formaldehyde is the preferred aldehyde which may be supplied in alcoholic solution or as paraformaldehyde. The aldehydes useful for reaction with active hydrogen for the generation of alkylol groups are well known and are illustrated by agents yielding formaldehyde such as paraformaldehyde and other monoaldehydes such as acetaldehyde, furfural and benzaldehyde. Polyaldehydes such as glyoxal would tend to cause gelation and are not desired.

The alkylol group, especially the methylol group, is strongly reactive with the hydroxy group when the solvent is removed and elevated temperatures used as occurs when the resin solution is coated on a base and baked. This provides a thermosetting cure to build heat and solvent resistance into a system which is initially of high solubility. It should be noted that the alkylol group is produced in the same way regardless of the agent selected, though the primary or secondary nature of the hydroxy portion of the group may vary.

If desired, acid catalysis, removal of water and the presence of alcoholic solvents may be used to encourage etherification, but this is not essential.

The various reactions noted are carried out in solution in organic solvent. Typical solvents include aromatic hydrocarbons, such as xylene and its homologs, ketones such as methyl ethyl ketone, and others such as dimethyl formamide, dioxane, etc. The formaldehyde reaction is aided by the presence of an alcohol such as butanol, propanol, 2-ethoxy ethanol, 2-butoxy ethanol and the like which are good solvents for the aldehyde and for the final alkylol-containing resin.

It is stressed that while other film-forming resins, reactive or not, may be added, the products of the invention are thermosetting per se without the addition of external curing resins or catalysts.

The invention is illustrated in the Examples which follow:

EXAMPLE I

A polyglycidyl ether of bisphenol A having an average molecular weight of about 1000 and an epoxy value of 0.20 equivalent per 100 grams is combined with acrylamide in a 1:1 mol ratio by reacting the same in a 50% solids solution containing equal parts by weight of butanol and diacetone alcohol as solvents. The reaction was conducted by heating the liquid solution of 140° F. until the Gardner-Holdt room temperature viscosity is from X–Z.

EXAMPLE II

The solution product of Example I is combined with a 50% solvent solution containing 468 grams of methyl methacrylate, 522 grams of butyl acrylate and 56 grams of acrylic acid dissolved in a commercial mixture of aromatic hydrocarbon solvents having a boiling range of from 145–195° C. By combining 50 parts of the solution product of Example I with 50 parts of the methyl methacrylate-butylacrylate-acrylic acid solution and refluxing at atmospheric pressure for eight hours in the presence of 1.0% by weight of benzoyl peroxide based on total polymerizable material, copolymer is formed in good yield to provide a solution having a Gardner-Holdt viscosity of X–Y measured at room temperature.

EXAMPLE III

The copolymer solution product of Example II has added thereto 102 grams (.81 mol) of melamine which reacts with the approximately 1 equivalent of epoxy functionality in the copolymer to form an adduct therewith, the reaction taking place under reflux conditions for one hour. One hundred twenty three grams of formaldehyde (4.1 mols) are then added in solution in 184 grams of butanol (2.5 mol) (40% n-butyl formcel) and refluxing is continued to a Gardner-Holdt viscosity of $Z_2$–$Z_3$ measured at 20° C. The product has a solids content of 50% and an acid value of 18.6. Interestingly, no water is removed during these reactions and none is observed.

The solution product of the present example is useful as a coating to form, when baked, hard solvent resistant films.

Appropriate baking temperatures are broadly in the range of from 250° F.–500° F. for periods of time varying from one-half hour at the lowest temperature to one-half minute at the highest temperature.

Thus, baking for 15 minutes at 350° F. provides a pencil hardness of 2H and solvent insolubility as indicated by the capacity to resist removal by 100 double rubs with a cloth saturated with acetone. Baking for 50 seconds at 500° F. provides the same result.

EXAMPLE IV

The copolymer solution product of Example II has added thereto 138 grams of melamine (1.09 mols) and, after an adduct is formed, 165 grams of formaldehyde (5.5 mols) in solution in 247 grams of butanol (3.4 mols) are added and refluxing is continued to a Gardner-Holdt viscosity of $Z_2+$ measured at 20° C. The product has a solids content of 50% and an acid value of 13.4. No water is observed or removed.

Baking 15 minutes at 350° F. provides a coating having a pencil hardness of 4H–5H and full acetone resistance as reported in Example III. The same result is obtained by baking for 50 seconds at 500° F.

EXAMPLE V

The copolymer solution product of Example II has added thereto 208 grams of melamine (1.65 mols) and, after an adduct is formed, 300 grams of formaldehyde (10.0 mols) in solution in 450 grams of butanol (6.1 mols) are added and refluxing is continued to a Gardner-Holdt viscosity of $Z_4$ measured at 20° C. The product has a solids content of 50% and an acid value of 10.6. Baking a coating thereof 15 minutes at 350° F. or at 500° F. for 50 seconds provides a pencil hardness of 6H and full acetone resistance.

EXAMPLE VI

The copolymer solution product of Example II has added thereto 49 grams of urea (.81 mol) and, after an adduct is formed by continued reflux, 72 grams of formaldehyde (2.40 mols) are added and refluxing is continued to a Gardner-Holdt viscosity of $Z_1$–$Z_2$ measured at 20° C. The product has a solids content of 50% and an acid value of 15.75. Baking a coating thereof 15 minutes at 350° F. or at 500° F. for 50 seconds provides a pencil hardness of 2H and full acetone resistance.

Examples III, IV, V and VI are repeated using a solution copolymer of styrene, ethyl acrylate and glycidyl methacrylate in weight proportions of 55/30/15, the solution containing 50% solids in the same solvents used in the solution product of Example II. Comparable reuslts are obtained.

The coatings of the invention are useful for the protection and decoration of metal surfaces and may be applied clear or pigmented and with or without preliminary treatment of the metal as by phosphating, chromating or priming the same.

Pigments, dyes, waxes, flow control agent, light and heat stabilizers and the like may be included in the coatings for decorative purposes and the like without affecting the significant characteristics of the heat-hardening resins of the invention or the coatings containing the same.

The invention is defined in the claims which follow.

I claim:

1. Non-gelled, organic solvent-soluble thermosetting resin comprising resinous epoxy-functional copolymer of monoethylenically unsaturated 1,2-epoxy compound and ethylenically unsaturated material free of epoxy functionality, said epoxy-functional copolymer having at least a portion of the epoxy functionality thereof reacted with a polyfunctional amine or amide in an amount of at least 5% based on the weight of the final resin to form an hydroxy amine or hydroxy amide adduct with said copolymer, said adduct containing residual amine or amide functionality, said residual amine or amide functionality being reacted with aldehyde to thereby generate alkylol groups and provide both alkylol and hydroxy functionality for thermosetting cure, said reactions being carried out in the liquid phase in solution in an inert organic solvent.

2. Thermosetting resin as recited in claim 1 in which said ethylenically unsaturated material free of epoxy functionality consists of vinyl monomer and said epoxy compound is employed in an amount of from 3–50% by weight of the copolymer.

3. Non-gelled, organic solvent-soluble thermosetting resin comprising resinous epoxy-functional copolymer of 3–50% by weight of monoethylenically unsaturated 1,2-epoxy reaction product of a polyglycidyl ether of a dihydric phenol in which a pair of phenolic groups is interlinked through an intervening aliphatic linkage and a stoichiometric deficiency of monoethylenically unsaturated monoamide, with the balance of the copolymer consisting essentially of vinyl monomer free of epoxy functionality, said epoxy-functional copolymer having at least a portion of the epoxy functionality thereof reacted with a polyfunctional amine or amide in an amount of at least 5% based on the weight of the final resin to form an hydroxy amine or hydroxy amide adduct with said copolymer, said adduct containing residual amine or amide functionality, said residual amine or amide functionality being reacted wth aldehyde to thereby generate alkylol groups and provide both alkylol and hydroxy functionality for thermosetting cure, said reactions being carried out in the liquid phase in solution in an inert organic solvent.

4. Thermosetting resin as recited in claim 1 in which said ethylenically unsaturated epoxy compound is the reaction product of diglycidyl ether of a bisphenol with an acrylamide in equimolar amounts.

5. Thermosetting resin as recited in claim 1 in which said copolymer is reacted with urea.

6. Thermosetting resin as recited in claim 1 in which said copolymer is reacted with a triazine.

7. Thermosetting resin as recited in claim 1 in which said copolymer is reacted with melamine.

8. Thermosetting resin as recited in claim 1 in which said epoxy functional copolymer is reacted with a polyfunctional amine to form an adduct which is reacted with excess formaldehyde.

9. A coating composition comprising an inert organic solvent having the resin of claim 1 dissolved therein.

10. Thermosetting resin as recited in claim 1 in which said epoxy-functional copolymer is reacted with a stoichiometric excess of polyfunctional amine, and is then reacted with excess formaldehyde.

11. Thermosetting resin as recited in claim 10 in which said polyfunctional amine is present in an amount of at least 5%, based on the weight of final resin, and is used in an amount to provide at least 1.2 moles of amine per epoxy group in said epoxy-functional copolymer.

References Cited

UNITED STATES PATENTS 3,069,373  12/1962  Greenlee _____ 260—62

OTHER REFERENCES

Chemical Abstracts (C. A.) 14311C, vol. 58, June 1963, Chem. Lib.

Chemical Abstracts (C.A.) 7957f, vol. 62, March 1965, Chem. Lib.

Chemical Abstracts (C.A.) 10404c, vol. 58, May 1963, Chem. Lib.

WILLIAM SHORT, Primary Examiner

T. PERTILLA, Assistant Examiner

U.S. Cl. X.R.

117—127; 260—37, 67, 67.6, 68, 72, 29.1

FO-1050
(5/69)

UNITED STATES PATENT OFFICE
CERTIFICATE OF CORRECTION

Patent No. 3,507,828          Dated April 21, 1970

Inventor(s) Henry Ashjian

It is certified that error appears in the above-identified patent and that said Letters Patent are hereby corrected as shown below:

Column 2, line 31, "$CH_2C=C <$" should be read --$CH_2=C <$--.

Column 2, line 61, "3-5%" should be read --3-50%--.

Column 3, line 29, after "acetaldehyde" insert --butyraldehyde--.

Column 3, line 66, "of" should be read --at--.

SIGNED AND
SEALED
OCT 6 - 1970

(SEAL)
Attest:

Edward M. Fletcher, Jr.
Attesting Officer

WILLIAM E. SCHUYLER, JR.
Commissioner of Patents